Oct. 13, 1970  C. A. BAILEY ETAL  3,534,132
METHOD OF MAKING AN INSULATED SODIUM CABLE
Filed May 9, 1967  2 Sheets-Sheet 1

INVENTORS
CARL A. BAILEY,
RAYMOND E. ISAACSON

ATTORNEY

Oct. 13, 1970     C. A. BAILEY ETAL     3,534,132
METHOD OF MAKING AN INSULATED SODIUM CABLE
Filed May 9, 1967     2 Sheets-Sheet 2

INVENTORS
CARL A. BAILEY,
RAYMOND E. ISAACSON
BY
ATTORNEY

United States Patent Office 3,534,132
Patented Oct. 13, 1970

3,534,132
METHOD OF MAKING AN INSULATED SODIUM CABLE
Carl A. Bailey, Fairfield, and Raymond E. Isaacson, Trumbull, Conn., assignors to General Electric Company, a corporation of New York
Filed May 9, 1967, Ser. No. 637,211
Int. Cl. B29f 3/10; B32b 31/30
U.S. Cl. 264—104                    22 Claims

ABSTRACT OF THE DISCLOSURE

An insulated electrical cable is made by forming an insulating coating around liquid sodium whereby the coating envelops the liquid sodium. The insulating coating comprises a polymer capable of being chemically cured, a reinforcing filler and a curing agent. The formed product is passed through a non-aqueous heat transfer medium maintained at a temperature sufficient to effect curing in situ of the polymer, and then cooled at a temperature sufficient to solidify the sodium.

---

Figure 1:
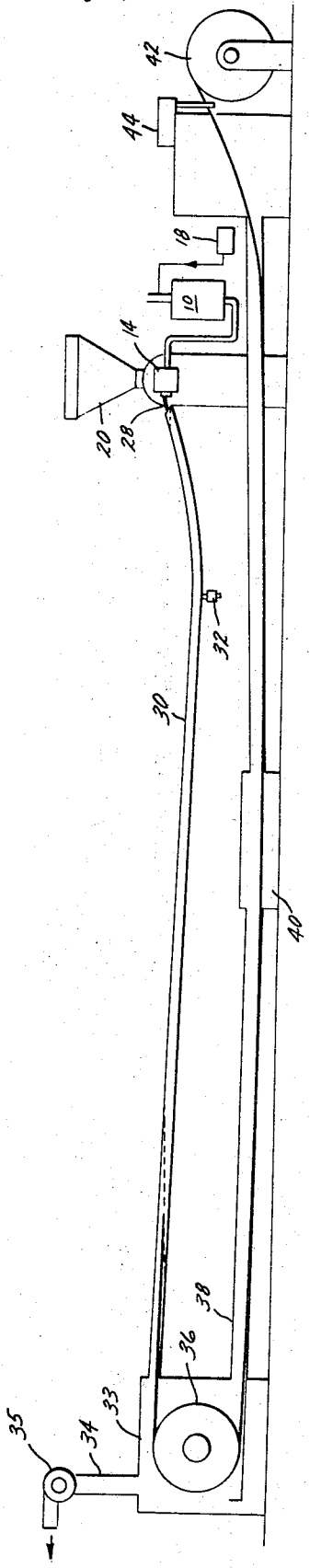

The value of metallic sodium and its alloys as an electrical conductor has been recognized since the beginning of this century. The conductivity of sodium as a practical metal conductor for wire and cable ranks behind that of copper and aluminum, but it is substantially lighter than either of the other two metals and considerably less expensive. Notwithstanding the attractive economics of sodium as a conductor in wire and cable, it has been very difficult for a sodium cable to achieve any particular commercial success.

The prior art discloses several concepts for making a sodium cable, which recognizes the value of a sodium as a conductor. According to a disclosure by DeKonig, the sodium, as it emerges from an extrusion press, is wrapped with paper tape. The operation is conducted in a nitrogen atmosphere to reduce hazards. Also, French Pat. 973,315 discloses in very general terms an insulated conductor having a core of sodium and a sheath formed of lead, plastic, or a polymer. However, this patent does not suggest how a cable having a polymeric sheath is formed nor what polymers might be employed. More recently, French Pats. 1,441,374 and 1,459,666 disclose a conductor comprising a sodium core and a metallic sheath of copper or aluminum.

Currently, there is experimentation with insulated sodium cable comprising a conductive core of sodium and a polyethylene insulating jacket. According to disclosures by Humphrey et al. published in the Institute of Electrical and Electronics Engineers, Papers No. 31 PP66,443 and No. 31 PP66,444, the cable is formed by extruding a poylethylene tube which is simultaneously filled with liquid sodium, and then passed through a cooling bath. These disclosures relate exclusively to thermoplastic polyethylene insulating coatings, however, and in no way involve the use of a thermosetting or cross-linked polyethylene composition.

Cross-linked polymeric compositions, especially cross-linked polyethylene, have achieved extensive use as insulation materials for wire and cable. The thermosetting or cross-linked compositions possess numerous advantages over the thermoplastic compositions, and in addition exhibit superior electrical and physical properties. In manufacturing a cable insulated with cross-linked polyethylene, for example, the polyethylene composition, which has been properly compounded, is extruded around the copper conductor, and then passed through a curing oven where the polyethylene is cured under steam pressure of from about 200 to 250 p.s.i.g. It is apparent that the same process could not be employed in manufacturing an insulated sodium conductor. In the first place, working with sodium in a water and or water vapor environment is extremely hazardous. Secondly, sodium has a melting point of 97° C., and therefore is liquid at the temperatures employed in the manufacture of the cable. The insulation layer is in a plastic state when it is passed from the extruder to the curing oven, and consequently the high pressures employed in the oven would compress the walls of the cable and squeeze the sodium out from its insulation jacket.

The purpose of this invention is to provide an insulated cable having a conductive core of sodium and an insulation layer of cross-linked polymer formed directly over the sodium core, and to provide a method for making the cable.

The terms "wire" and "cable" as used herein and in the appended claims refer to synonymous terms and are used interchangeably.

According to the broad aspect of this invention, an insulated electrical cable is formed having a conductive core of liquid sodium and an insulating layer formed directly over the conductive core. The insulating layer comprises a polymer capable of being chemically cured or cross-linked and which is substantially resistant to attack by liquid sodium at the operating temperatures, a curing agent (e.g., organic peroxide), and a reinforcing filler. The formed cable is passed through a non-aqueous heat transfer medium which is maintained at a temperature sufficient to effect curing in situ of the polymer, and is then cooled at a temperature sufficient to solidify the sodium. The cable is formed in a continuous process, and the resulting product exhibits good electrical and physical properties, described hereinbelow in greater detail.

Figure 2:
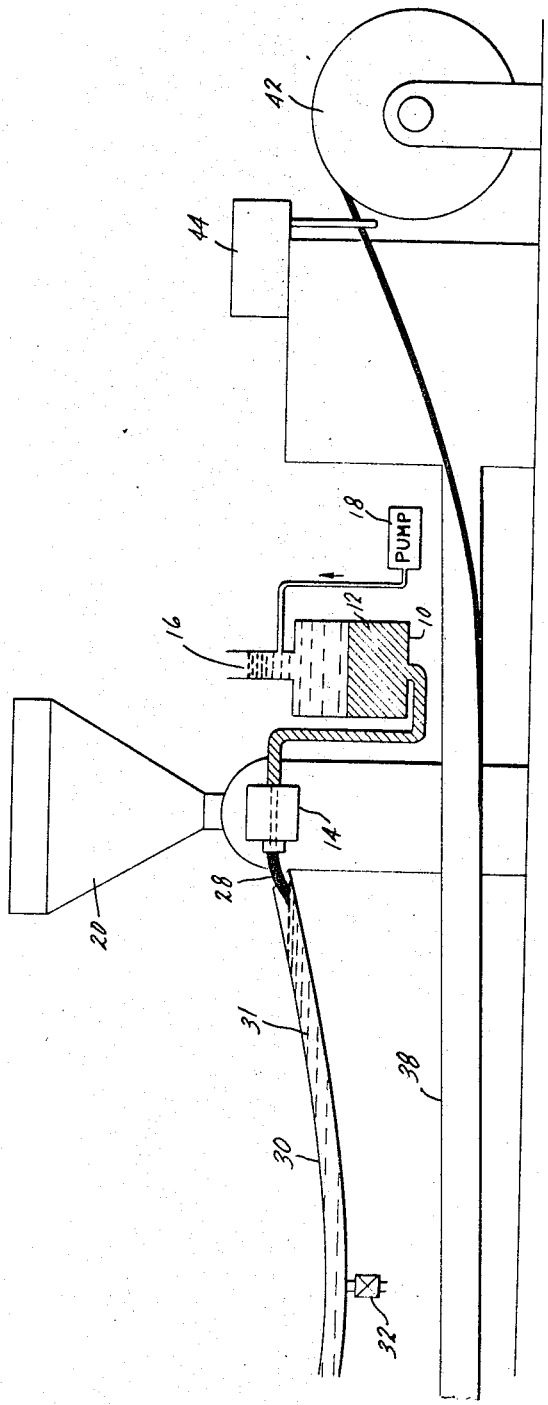
Figure 3:
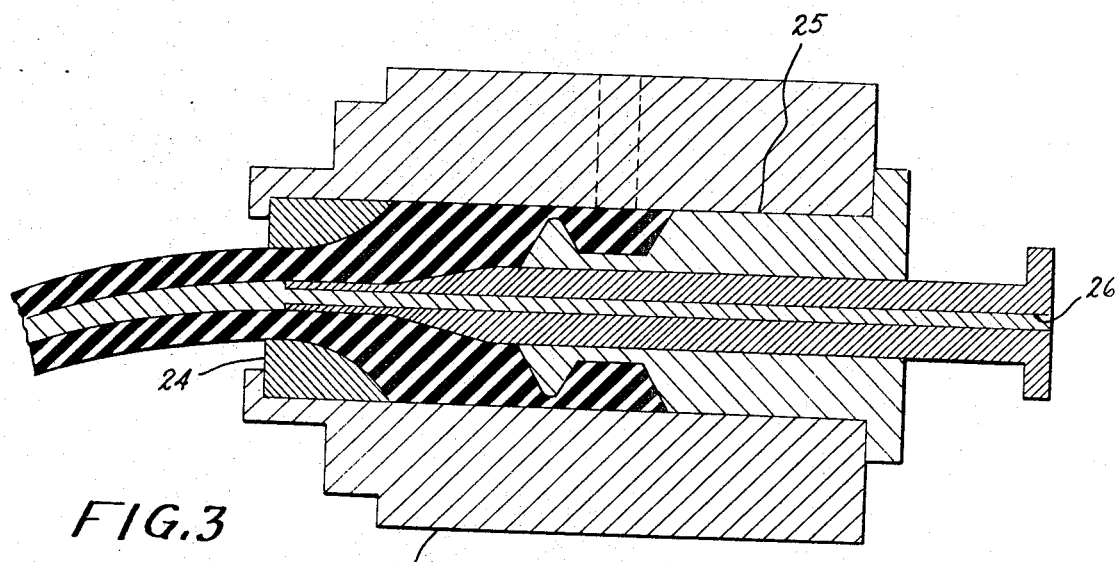
Figure 4:
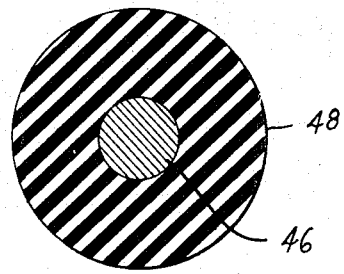
Figure 5:
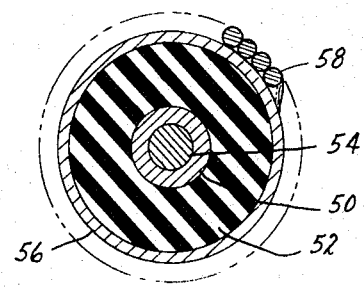

In order to describe the invention in greater detail, reference is now made to the accompanying drawings. FIG. 1 diagrammatically illustrates apparatus for carrying out the invention. FIG. 2 diagrammatically illustrates in more detail some of the apparatus of FIG. 1. FIG. 3 is a cross-sectional fragmentary view of an extrusion head adaptable for use in the production of the cable of this invention. FIG. 4 is a cross-sectional view of a cable made in accordance with the present invention. FIG. 5 is a cross-sectional view of a cable illustrating an alternative embodiment of the invention.

Referring to the drawings wherein like reference numerals designate similar parts throughout, there is shown a drum 10 for feeding liquid sodium 12 to the extrusion press 14. The drum is heated by any conventional means such as a heating coil in order to maintain the sodium in a liquid state. Sodium is fed to the drum from a suitable source (not shown) by either a batch or continuous process. An oil batch 16 is maintained over the liquid sodium in the drum in order to protect the sodium from the atmosphere. Also, the level of oil in the drum, which is controlled by variable speed pump 18, regulates the pressure at which the sodium is fed to the extruder. the polymeric insulation compound is fed to extruder 14 by a hopper 20. In the process, the polymer and liquid sodium are simultaneously extruded in such a manner that the polymer envelops the liquid sodium. This can be seen in greater detail in FIG. 3 which shows an extruder head 22 having a hollow die 24 of cylindrical shape centered inside the head and in communication with the sodium supply. The gap between the die and sizing mandrel 25 define the wall thickness of the coating. The liquid sodium is pressed or extruded through bore 26 of sizing mandrel 25 at a speed corresponding to the speed of extrusion of the polymeric insulation tube thereby filling the tube with sodium which in turn is completely enveloped by the insulation layer. It should be understood that the coating composition is extruded at a temperature to render it plastic for working but below the decomposition temperature of the curing agent so as to avoid incipient cure. For example, when using a mineral filled polyethylene composition and an organic peroxide curing agent such as di-α-cumyl peroxide, the composition is extruded at a temperature of from about 225 to 290° F., and more desirably about 250 to 275° F. The simultaneous extrusion of two components such as disclosed herein is, in general, well known in the art and forms no part of the present invention.

Upon emerging from the extruder, and while still in a substantially plastic state, the formed product 28 is passed through elongated tube 30 containing a heat transfer medium 31. Tube 30 is provided with a suitable drain means 32 having an appropriate valve (not shown). The heat transfer medium is maintained at an elevated temperature sufficient to effect curing in situ of the polymer. The temperature required will depend primarily upon the curing agent employed, and where an organic peroxide curing agent is used, for example, this temperature may range from about 300 to 475° F. The length of tube 30 and the rate of travel through the tube should allow sufficient dwell time of product 28 in the heat transfer medium to effect substantial curing of the polymer, and may be determined readily by one skilled in the art. Tube 30 is heated as by an electric heating coil or other suitable means. Also, it should be understood that other means for maintaining the curing bath, such as a vat or tank, may be substituted for tube 30, but the tubular member provides a convenient and practical means requiring a minimum of apparatus and heat transfer medium.

Pipe 30 terminates at housing 33 which preferably is vented to the atmosphere through vent tube 34 having an exhaust fan 35. A capstan 36 is maintained in housing 33, and the cable passing from the pipe is passed over the capstan and into an elongated cooling pipe 38. The cooling pipe is maintained at a temperature sufficiently low to solidify the sodium. Generally, it is sufficient to operate the cooling pipe at room temperature, and exhaust fan 35 draws air through the pipe counter to the cable passing therethrough. Where desired, other means may be employed for cooling the cable and solidifying the sodium. For example, the cooling pipe may be provided with a jacket and a refrigerant passed through the jacket, or the cooling pipe may contain a fluid maintained at the desired low temperature. Here again, it should be understood that a vat or tank may be substituted for cooling pipe 38. A sump 40 in cooling pipe 38 provides means for draining any fluids from the cable which may have been carried over from tube 30. The resulting product is then wound on take-up reel 42 provided with a traverse mechanism 44 to assure level winding of the cable.

There is shown in FIG. 4 a cable made in accordance with the invention. The cable comprises a conductive core of sodium 46 and an insulation coating of chemically cross-linked polymer 48, e.g. polyethylene. It will be observed that the wall thickness of the insulation coating and the diameter of the core are controlled by the extrusion operations. Where desired, the cable may be provided with one or more additional concentrically arraged coatings or covers, which will depend upon the specific application for the cable, and may be determined by one skilled in the art. These may include, for example, an insulation layer, a semi-conductive layer, a metallic shielding braid and/or a metal sheath.

According to the modification illustrated in FIG. 5, the inner semi-conductor layer 50 and insulation layer 52 may be extruded simultaneously with the sodium core 54. The inner semi-conducting layer provides a uniform potential at the inner diameter of insulation so that if discontinuities occur, ionization is substantially prevented. The inner semi-conducting layer may comprise polyethylene, ethylene-propylene rubber or other suitable polymer which is substantially resistant to attack by liquid sodium, a high percentage of carbon black and a curing agent such as an organic peroxide. An outer semi-conducting layer 56, which may be, for example, an extruded layer of polyethylene or polyvinyl or a butyl tape, is formed over the insulating layer, and the cable is then provided with a grounded conductor 58 such as helically wrapped tinned copper wire.

During the extrusion of the insulation composition, air may be entrapped or encapsulated in the coating. The encapsulated air can cause the formation of voids in the insulation coating and further can cause an extremely rough surface thereby detracting from the utility and appearance of the cable. For that reason, it is desirable that the extruder be vented and provided with suitable suction means to draw air from the composition undergoing extrusion. In this manner, the encapsulation of air in the extrudate is minimized or substantially eliminated.

It is known that upon chemically curing a polymer, gases are generated. In the manufacture of cable, these gases might result not only in the formation of voids in the insulation itself, but can cause a void or gap between the conductive core and the insulation coating. The amount of gases generated is believed to be dependent primarily upon such factors as the type of curing agent used and upon whether or not the filler received any special pre-treatment. In order to insure proper filling of the insulation tubing and to insure obtaining the desired diameter of the cable, the operation preferably is conducted at a pressure differential defined by the ratio of the pressure of the heat transfer medium to the pressure of the liquid sodium of less than 1 pound per square inch, and more preferably about ¼ pound or less.

As described above, the formed cable emerging from the extruder is passed through a heat transfer medium maintained at an elevated temperature sufficient to effect curing of the polymer. It will be observed that the heat transfer medium must be substantially inert toward the polymer. Any of a number of heat transfer materials may be employed and these may include organic fluids, molten salts and salt solutions, and molten metal alloys. In the preferred embodiment of the invention, a polyalkylene glycol is employed, which may be either water soluble or water insoluble and have a viscosity range of from 50 to 90,000 Saybolt Universal seconds at 100° F. such as those sold under the tradename Ucon fluids. Other suitable organic fluids include, for example, glycerol and esters thereof, and propylene plycol and esters thereof.

In accordance with one embodiment of our invention, the heat transfer medium contained in the heating pipe is maintained at different temperatures to provide for two or more temperature zones along the path of travel of the cable through the curing bath. This is particularly desirable where using a polyalkylene glycol, mentioned above. The zone where the extruded cable first enters the curing bath (first zone) is maintained at a relatively higher temperature than that near the opposite end of the bath, and is at a temperature substantially in excess of that normally required to cure the polymer within practical time limits. The cable emerging from the extruder is necessarily at a lower temperature than the temperature of the first zone, and, in fact, is below the decomposition temperature of the curing agent in order to avoid incipient cure. When the cable enters the first zone, the polymer is force cured without causing excessive volatilization and thereby resulting almost immediately in the formation of a relatively rigid and stable product. The remaining zone, or zones, operated at a lower temperature than the first zone provide sufficient dwell time to effect curing in situ of the polymer. The temperature conditions required for the zones will depend primarily upon such factors as the type of curing agent, the type of polymer, and the cable size. In the manufacture of a sodium cable having an insulation layer comprising mineral filled polyethylene and an organic peroxide curing agent such as di-α-cumyl peroxide, the first zone is maintained at a temperature of about 400° F. or above, and preferably 400 to 425° F. It will be observed that as the cable travels through the curing bath, the cable temperature increases and consequently the heat lost from the heat transfer medium is not as rapid. Therefore, a second or intermediate zone is maintained at a lower temperature than the first zone so as not to overheat the cable. The temperature of the second zone is from about 375 to 400° F. In the third or last zone, the temperature is maintained at about 350 to 375° F.

In accordance with the invention, the insulation composition comprises a curable polymer, a curing agent, and a reinforcing filler. Also, certain additives are usually compounded with the polymeric blend. These compounding additives include, for example, an antioxidant such as polymerized trimethyldihydroquinoline, a lubricant such as calcium stearate to prevent the composition from sticking during fabrication, a non-combustible additive such as antimony oxide to promote flame retardance, a co-agent such as polybutadiene to facilitate cross-linking, and a small amount of pigment or coloring agent. The compounding agents required may vary considerably, and there may be others than those mentioned, depending upon the properties sought for the end product. In preparing the insulation composition, the polymer, filler, and other compounding additives are intimately admixed as in a Banbury. A suitable curing agent, desirably an organic peroxide, is then incorporated into the admixture to effect cross-linking of the polymer upon curing. The composition may then be fed to the wire extruder for fabrication of the cable. This compounding operation is well known in the art and constitutes no part of the present invention.

The polymer included within the scope of the present invention may be either a homopolymer, a copolymer, or a blend of two or more polymers, and should be substantially inert to sodium at the temperatures used in the manufacture of the insulated cable and at the operating temperatures of the cable over prolonged periods. Polymers useful in this invention include the polyolefins, for example, polyethylene, polypropylene, polybutene, ethylene-propylene rubber, ethylene-propylene ter-polymer, butadiene, isoprene, and other such mono and di-olefins. Where desired, the olefinic polymer may be co-polymerized with other polymers. Suitable copolymers with the polyolefin include, for example, vinyl acetate, ethylacrylate, and butene-1, wherein the copolymer comprises about 75–90% by weight of polyolefin and the balance being the other polymerizable material. The amount of polyolefin used in the copolymer will alter somewhat the properties of the end product, and therefore may be varied wtihin the specified range to achieve the required results. The polyolefin or copolymer of polyolefin and other polymerizable material, may be blended with one or more other polymers such as ethylene-propylene rubber and vinyl acetate.

A suitable filler is compounded with the insulation composition to provide the composition with sufficient strength necessary for fabricating the cable so that it will retain its structure during fabrication. The fillers utilized in the composition may be any of those commonly employed in polymeric compositions and include the various carbon blacks and mineral fillers. The mineral fillers useful in the invention include, for example, aluminum silicate, aluminum oxide, calcium silicate, silica, magnesium silicate, titanium dioxide and mixtures thereof. These filler materials are well known and readily available on the market, and the type of filler used will depend largely on the desired properties for the end product and may be determined by one skilled in the art. The titanium di- oxide filler typically possesses a particle size of about 0.2 to 0.4 micron (mean diameter) and a specific gravity of about 3.9 to 4.1. The other filler materials typically are calcined to reduce the moisture content to less than 0.5% by weight, and generally possess a particle size of the order of 2 microns diameter and a specific gravity of about 2.5 to 2.8. However, also applicable is a magnesium silicate filler having a plate-like structure, a particle size not greater than 6 microns, and desirably a specific surface area of 18 to 20 square meters per gram, as determined by BET Gas Absorption Method and a specific gravity of about 2.7 to 2.8.

The function of fillers in polymeric insulation compositions is well known, and the amount of filler incorporated into the composition may be varied depending upon the properties desired in the cured product. The filler content may range from about 20 to 50% by weight of the composition, and more preferably about 25 to 40% by weight.

In the preferred embodiment of the invention, the filler, other than a carbon black filler, is treated with an alkoxy silane, and preferably an alkoxy silane selected from the group of lower alkyl alkoxy silane, alkenyl alkoxy silane, and alkynyl alkoxy silane. This is particularly advantageous in that the cured insulation coating having incorporated therein the treated filler is substantially more dense (less porous) than the cured insulation coating having a filler which was not treated with an alkoxy silane. Halogenated silanes, such as the chloro-silanes, are not desirable because of their corrosive activity and deleterious effects on electrical properties. In practicing the invention, the filler and alkoxy silane are added separately to the polymeric material, and the admixture compounded as in a Banbury. During this compounding operation, the alkoxy silane apparently coats or interacts with the filler, which in turn apparently facilitates a filler-polymer interaction. The filler is treated with about 0.2 to 3% by weight of alkoxy silane. An excess of alkoxy silane apparently acts like a plasticizer, which consequently appears to degrade the tensile strength and electrical properties of the cured composition, and therefore is avoided. Suitable alkoxy silanes include, for example, methyl ethoxy silane, methyl tris (2-methoxy ethoxy) silane, dimethyl diethoxy silane, allyltrimethoxy silane, and the vinyl silanes such as vinyl tris (2-methoxy ethoxy) silane, vinyl trimethoxy silane, and vinyl triethoxy silane.

The compounding operation is conducted within a temperature range high enough to render the admixture sufficiently plastic to work, but below the reacting temperature or decomposition temperature of the curing agent so that the curing agent will not decompose thereby causing at least partial or incipient curing of the polyethylene stock during the normal mixing cycle. Desirably, the curing agent employed in the operation is an organic peroxide, such as a tertiary peroxide, and characterized by at least one unit of the structure

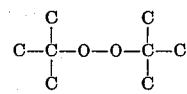

which decomposes at a temperature in excess of about 295° F. The use of these peroxide curing agents in effecting cross-linking of polymers such as polyethylene compounds is adequately described in U.S. Pats. 3,079,370, 2,888,424, 3,086,966, and 3,214,422, which patents are incorporated in this specification by reference. The most commonly used peroxide curing agent, and the agent preferred, is di-α-cumyl peroxide. Other useful curing agents include the tertiary diperoxides such as 2,5-dimethyl-2,5(t-butyl peroxy) hexane and 2,5-dimethyl-2,5-di(t-butyl peroxy) hexyne-3, and the like diperoxy compounds.

The proportion of peroxide curing agent used depends largely on the mechanical properties sought in the cured product, for example, hot tensile strength. A range of from about 0.5 to 10 parts by weight of peroxide per hundred parts of polymer satisfies most requirements, and the usual proportion is of the order of two to four parts peroxide. In a typical production operation employing a tertiary peroxide as a curing agent, compounding is conducted at a temperature of from about 200 to 275° F. If compounding is conducted at a temperature much higher than the stated maximum, the peroxide will decompose thereby causing premature curing of at least a portion of the polymer. As a consequence, the compound will be difficult to fabricate and the final product will exhibit an irregular or roughened surface.

The invention is further illustrated in the following example wherein an insulation composition was first prepared by conventional compounding technique in a Banbury according to the following recipe:

| | Percent by weight |
|---|---|
| Polyethylene | 61.80 |
| Aluminum silicate | 30.90 |
| Vinyl tris(2-methoxy ethoxy) silane | 0.93 |
| Di-α-cumyl peroxide (90% active) | 2.20 |
| Carbon black (pigment) | 3.09 |
| Polymerized trimethyldihydroquinoline | 1.08 |

The compound was extruded at about 270° F. and at a rate of about 3 to 5 feet per minute while simultaneously filling the extruded tube with liquid sodium. The extruded cable had an outside diameter of about 775 mils and an insulation wall thickness of about 175 mils.

Upon emerging from the cable was passed through a pipe 30 feet in length and heated by an electric coil to a temperature of between about 325 to 400° F. The pipe was filled with a polyalkylene glycol sold under the tradename Ucon fluids. In some runs Ucon LB-300-X was used, and for others Ucon 50-HB-280-X, these fluids having a viscosity in Saybolt Universal seconds of 300 and 280, respectively. The cable was then passed through an air cooled pipe of about 30 feet in length to cool the cable and solidify the sodium.

We claim:

1. The method of making an insulated electrical cable, which comprises: forming an insulating layer around a conductive core of liquid sodium; said insulating layer comprising a cross-linkable polymeric material which must be chemically cross-linked, a cross-linking agent, and a reinforcing filler, and characterized by substantial inertness to liquid sodium at the temperature of forming the cable; passing the resulting formed cable through a non-aqueous heat transfer medium maintained at a temperature sufficient to effect substantial cross-linking in situ of said polymeric material, and cooling the resulting product at a temperature sufficient to solidify the sodium.

2. A method according to claim 1 wherein said polymeric material is a member selected from the group consisting of polyolefins, blends of polyolefin and other polymers, and copolymers of polyolefin and other polymerizable materials.

3. A method according to claim 2 wherein said polyolefin is polyethylene.

4. A method according to claim 2 wherein said polymeric material is a copolymer of ethylene and vinyl acetate.

5. A method according to claim 1 wherein said heat transfer medium is an organic fluid and is maintained at a temperature of about 300° F. to 475° F.

6. A method according to claim 5 wherein said heat transfer medium is a polyalkylene glycol.

7. A method according to claim 1 wherein said cross-linking agent is an organic peroxide in which there is at least one unit of the structure

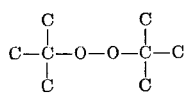

8. A method according to claim 1 wherein said reinforcing filler is a mineral filler.

9. A method according to claim 1 wherein said reinforcing filler is mineral filler which has been pretreated with an alkoxy silane.

10. A method according to claim 9 wherein said alkoxy silane is a vinyl silane.

11. A method of making an insulated electrical cable which comprises: extruding an insulation composition and simultaneously filling the extrudate with liquid sodium whereby said insulation composition envelops said liquid sodium; said insulation composition comprising a cross-linkable polymeric material selected from the group consisting of polyethylene, blends of polyethylene and other polymers, and copolymers of polyethylene and other polymerizable materials, an organic peroxide cross-linking agent, and a reinforcing filler, said insulation composition characterized by substantial inertness to liquid sodium at the temperature of extruding the cable; passing the resulting extruded form through a non-aqueous heat transfer medium maintained at a temperature of from about 300° F. to 475° F. to effect substantial cross-linking in situ of said polymeric material; and cooling the resulting product at a temperature to solidify the sodium.

12. A method according to claim 11 wherein said polymeric material is polyethylene.

13. A method according to claim 11 wherein said polymeric material is a copolymer of ethylene and vinyl acetate.

14. A method according to claim 11 wherein said heat transfer medium is a polyalkylene glycol.

15. A method according to claim 11 wherein said organic peroxide cross-linking agent has at least one unit of the structure

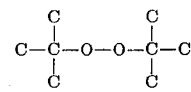

16. A method according to claim 11 wherein said reinforcing filler is a mineral filler.

17. A method according to claim 11 wherein said reinforcing filler is mineral filler which has been pretreated with an alkoxy silane.

18. A method according to claim 17 wherein said alkoxy silane is a vinyl silane.

19. A method according to claim 11 wherein said heat transfer medium is a polyalkylene glycol, and said filler is aluminum silicate treated with about 0.2 to 3% by weight of an alkoxy silane.

20. A method of making an insulated electrical cable which comprises: extruding an insulation composition and simultaneously filling the extrudate with liquid sodium whereby said insulation composition envelops said liquid sodium; said insulation composition comprising a cross-linking polymeric material selected from the group consisting of polyethylene, blends of polyethylene and other polymers, and copolymers of polyethylene and other polymerizable materials, an organic peroxide cross-linking agent having at least one unit of the structure

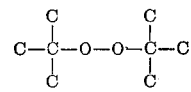

and a reinforcing mineral filler, said insulation composition characterized by substantial inertness to liquid sodium at the temperature of extruding the cable; passing the resulting extruded form through a bath comprising a polyalkylene glycol maintained at a temperature of from about 300° F. to 475° F. to effect substantial cross-linking in situ of said polymer; and cooling the resulting product at a temperature to solidify the sodium.

21. A method according to claim 20 wherein said polymeric material is polyethylene and said filler is aluminum silicate.

22. A method according to claim 21 wherein said aluminum silicate was treated with an alkoxy silane.

References Cited

UNITED STATES PATENTS

| | | | |
|---|---|---|---|
| 2,576,045 | 11/1951 | Robinson et al. | 174—110.4 |
| 3,201,503 | 8/1965 | Benning | 264—95 |
| 3,333,037 | 7/1967 | Humphrey | 264—105 |
| 3,393,257 | 7/1968 | Cable | 264—105 |

OTHER REFERENCES

Sterman et al.: 21st Annual Technical Conference, Technical Papers, vol. XI, Boston, Mass., Mar. 1–4, 1965, pp. 1, 3, 4, 10, 13 and 14 of section VII–3.

ROBERT F. WHITE, Primary Examiner

R. SHEAR, Assistant Examiner

U.S. Cl. X.R.

264—171

Dedication 3,534,132.—*Carl A. Bailey*, Fairfield, and *Raymond E. Isaacson*, Trumbull, Conn. METHOD OF MAKING AN INSULATED SODIUM CABLE. Patent dated Oct. 13, 1970. Dedication filed Sept. 11, 1970, by the assignee, *General Electric Company*.

Hereby dedicates the entire patent to the Public.

[*Official Gazette January 26, 1971*]